United States Patent

Williams et al.

[11] Patent Number: 5,887,543
[45] Date of Patent: Mar. 30, 1999

[54] OPENING AND CLOSING APPARATUS FOR FEED DROPS IN A FEED CONVEYING SYSTEM

[76] Inventors: Millard M. Williams, 2305 Ridgeway; Larry J. Van Zee, 2505 Galeston Ave.; Gary A. Hall, 2440 Resolve Ave., all of Oskaloosa, Iowa 52577

[21] Appl. No.: 920,591

[22] Filed: Aug. 29, 1997

[51] Int. Cl.⁶ ................................................. A01K 5/02
[52] U.S. Cl. ...................... 119/57.1; 119/56.2; 119/57.4
[58] Field of Search .............................. 119/51.11, 56.1, 119/56.2, 57.1, 57.4

[56] References Cited

U.S. PATENT DOCUMENTS

| 4,031,857 | 6/1977 | Jones | 119/56.2 |
| 4,185,587 | 1/1980 | Kallin | 119/51.11 |
| 4,235,200 | 11/1980 | Shay | 119/51.11 |

FOREIGN PATENT DOCUMENTS

| 2165526 | 4/1986 | United Kingdom | 119/51.11 |

OTHER PUBLICATIONS

Millard M. Williams, Larry J. Van Zee, and Gary A. Hall; "Sworn Statement Regarding Experimental Use"; Feb. 11, 1998; Four (4) pages.

*Primary Examiner*—Robert P. Swiatek
*Attorney, Agent, or Firm*—Henderson & Sturm

[57] ABSTRACT

An opening and closing apparatus for feed drops in a feed conveying system has a plurality of containers are disposed for receiving feed from a conveyor system, each of the containers having an opening in the bottom thereof. A respective valve member is disposed adjacent each one of the openings and each respective valve member has a closed position for preventing feed from falling out of each respective opening, and an open position permitting the feed to fall out of each respective container through each respective opening therein. A somewhat rigid transverse member is provided adjacent to each one of the containers and this transverse member is biased to a first position and is movable to a second position. A respective elongated member is operatively attached at one end thereof to the transverse member and is operatively attached to a respective one of the valve members at the other end thereof.

4 Claims, 5 Drawing Sheets

OPENING AND CLOSING APPARATUS FOR FEED DROPS IN A FEED CONVEYING SYSTEM

CROSS-REFERENCE TO RELATED APPLICATIONS

Not Applicable.

STATEMENT REGARDING FEDERALLY SPONSORED RESEARCH OR DEVELOPMENT

Not Applicable.

MICROFICHE APPENDIX

Not Applicable.

BACKGROUND OF THE INVENTION

A feed drop is essentially a container attached to an animal feed conveying system. Any number of feed drops, from one to several hundred, may be attached to a single feed system and they are used to simultaneously dispense a preset amount of feed to each animal being fed. Feed dispensing from feed drops may be accomplished manually or automatically by pulling a tripping cable attached to all the feed drops. The animals may be fed from one to several times a day. After the feed drops are emptied and before the next feeding, the feed conveying system will be manually or automatically started and the feed will be deposited sequentially into each feed drop.

A typical feed drop discharge controller uses flexible cords, ropes or cables to which the feed drop dispensing device is attached. Such a feed drop is shown in U.S. Pat. No. 4,031,857, which is incorporated herein by reference. This dispensing device can be a pivoted door, a sliding door, a ball, a flap, a valve, etc. A flexible cord will adequately pull open a feed drop device but will not push the door back into place to close the feed drop opening. If any object, such as the feed itself, a feed pellet, a rock, or any other thing such as pulleys connected to the ropes malfunctioning interferes with the opening of the dispensing device, it may not completely close before the feed drop refilling begins. This is a serious problem. If the feed drop device does not close after the feed has been dispensed, the opening in the feed drop will allow additional feed to flow down to the animal while the feed conveying system is conveying feed. Feed may continue to flow through that open feed drop until the holding bin is emptied of several tons of feed. Some animals may get sick and die from overeating, feed is wasted and some animals will miss their scheduled feeding.

Consequently, there is a need for a new and improved opening and closing apparatus for a feed drop for solving the aforementioned problems.

BRIEF SUMMARY OF THE INVENTION

The present invention relates generally to an opening and closing apparatus for feed drops in a feed conveying system and more particularly to a positive close system. A plurality of containers are disposed for receiving feed from a conveyor system, each of the containers having an opening in the bottom thereof. A respective valve member is disposed adjacent each one of the openings and each respective valve member has a closed position for preventing feed from falling out of each respective opening, and an open position permitting the feed to fall out of each respective container through each respective opening therein.

A somewhat rigid transverse member is provided adjacent to each one of the containers and this transverse member is biased to a first position and is movable to a second position. A respective elongated member is operatively attached at one end thereof to the transverse member and is operatively attached to a respective one of the valve members at the other end thereof. Each of the elongated members are bendable to allow some differences in the relative position between the orientation of each respective one of the valve members with respect to the transverse member. The elongated members are resilient enough to tend to bias each respective one of the valve members to a substantially identical orientation at any one time with respect to the transverse member, whereby the closing of some of the valve members will tend to force other valve members to the closed position as well, even if such other valve members are in the process of sticking open due to a malfunctioning thereof.

The opening and closing apparatus can also include an air cylinder for pulling the transverse member to the second position thereof whereby the valve members will be moved to the open position. A pull regulator can be operably attached to the air cylinder for causing the air cylinder to decrease the speed of movement of the transverse member that is moved from the first position to the second position where the valve members are opened more slowly than they would otherwise move to allow plenty of time for the feed to drop out thereof.

There is also optionally included an in-line bleeder valve attached to the air cylinder for causing the air cylinder to increase the speed of movement of the transverse member as it is moved from the second position to the first position thereof whereby the valve members are closed more quickly than they would otherwise move, thereby more positively closing the valve members than if they were more slowly closed.

An object of the present invention is to provide an improved positive closing feed drop for a feed conveying system.

Another object of the present invention is to provide an opening and closing apparatus for feed drops in a feed conveying system which will minimize the possibility of a feed drop door being inadvertently held open instead of being closed.

A still further object of the present invention is to provide an air operated opening and closing device which causes the feed drop doors to open slowly to allow the feed time to drop out thereof.

A still further object of the present invention is to provide a feed drop in which the door closes quickly to aid in preventing the door from sticking open.

Other objects, advantages and novel features of the present invention will become apparent from the following detailed description of the invention when considered in conjunction with the accompanying drawings.

DETAILED DESCRIPTION OF THE INVENTION

Figure 1:
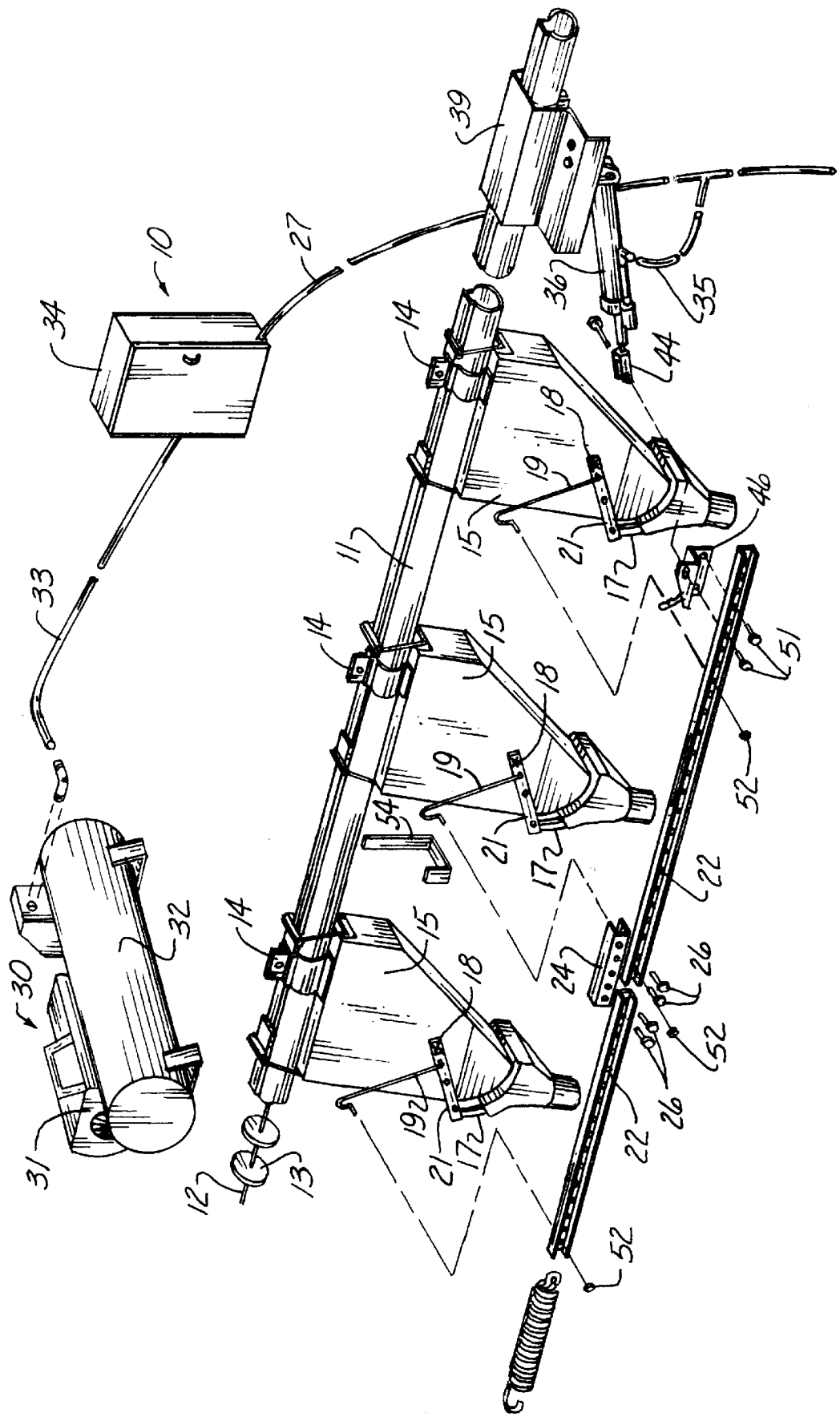
FIG. 1 is a perspective view of a plurality of feed drops connected to a cable conveyor shown in a somewhat schematic and somewhat exploded view.
Figure 5:
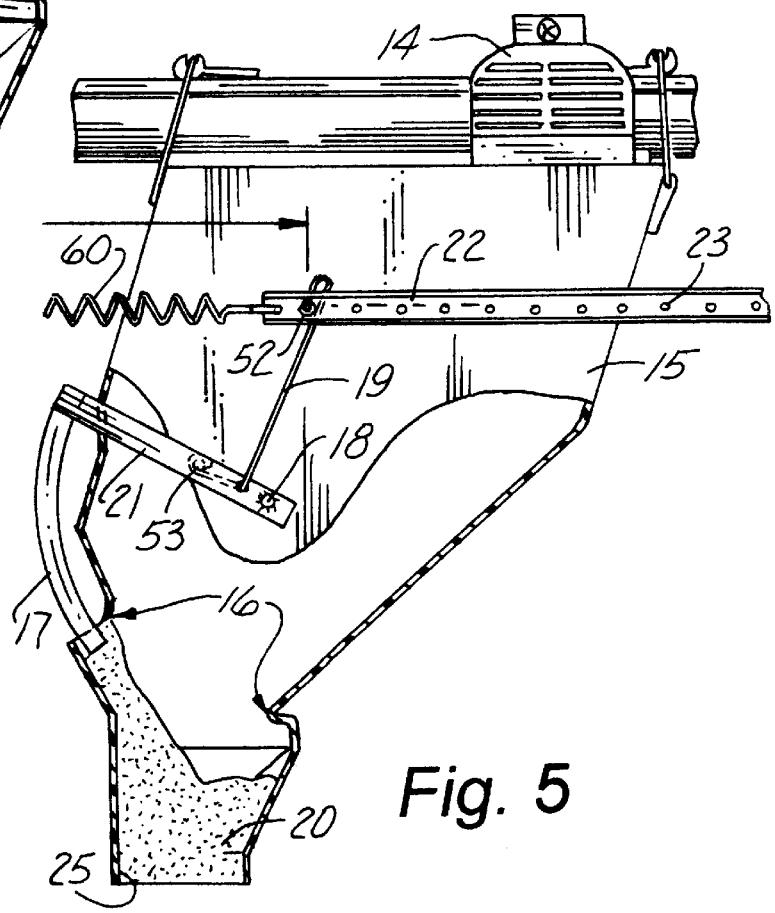
FIG. 5 is a side elevational view similar to FIG. 4 but showing the feed drop door opened so that the feed can drop out of the bottom thereof.

Referring now to the drawings wherein like reference numerals designate identical or corresponding parts throughout the several views, FIG. 1 shows an apparatus (10) constructed in accordance with the present invention and having a tube (11) in which feed is pulled through a cable (12) having nylon buttons (13) thereon. When rotary doors (14) are opened, feed will drop through an opening (not shown) below the doors (14) and through an opening in tube (11) to drop into a plastic feed drop container (15). The feed drop (15) has an opening (16) therein as can best be seen in FIG. 5.

A gate valve or door (17) is pivotally attached along a horizontal axis through point (18) and can be pulled up by spring steel wire (19) attached to member (21) which is rigidly attached to one end of the door or valve member (17). The spring steel member (19) is bolted to a transverse member (22) which has a plurality of openings (23) therein and which can be elongated by taking a short section (24) which is essentially identical to the cross-section of each of the members (22) so that longer rigid sections of member (22) can be used. J-members (54) are used to also support transverse member (22), especially in places where feed drops have been removed.

Fasteners (26) are used to connect members (22) to member (24) as shown in FIG. 1. A compressor (30) has an electric motor (31) thereon in an air tank (32) for providing air pressure through line (33). Cabinet (34) has a time clock and a push button therein as well as an air solenoid valve. Once the air solenoid valve is open either by manually pushing the push button or by actuation through setting the time clock, it opens and actuates the air cylinder. This causes air pressure through line (27) and thereby into line (35) to cause the air cylinder to shorten and pull on the transverse member (22).

Figure 2:
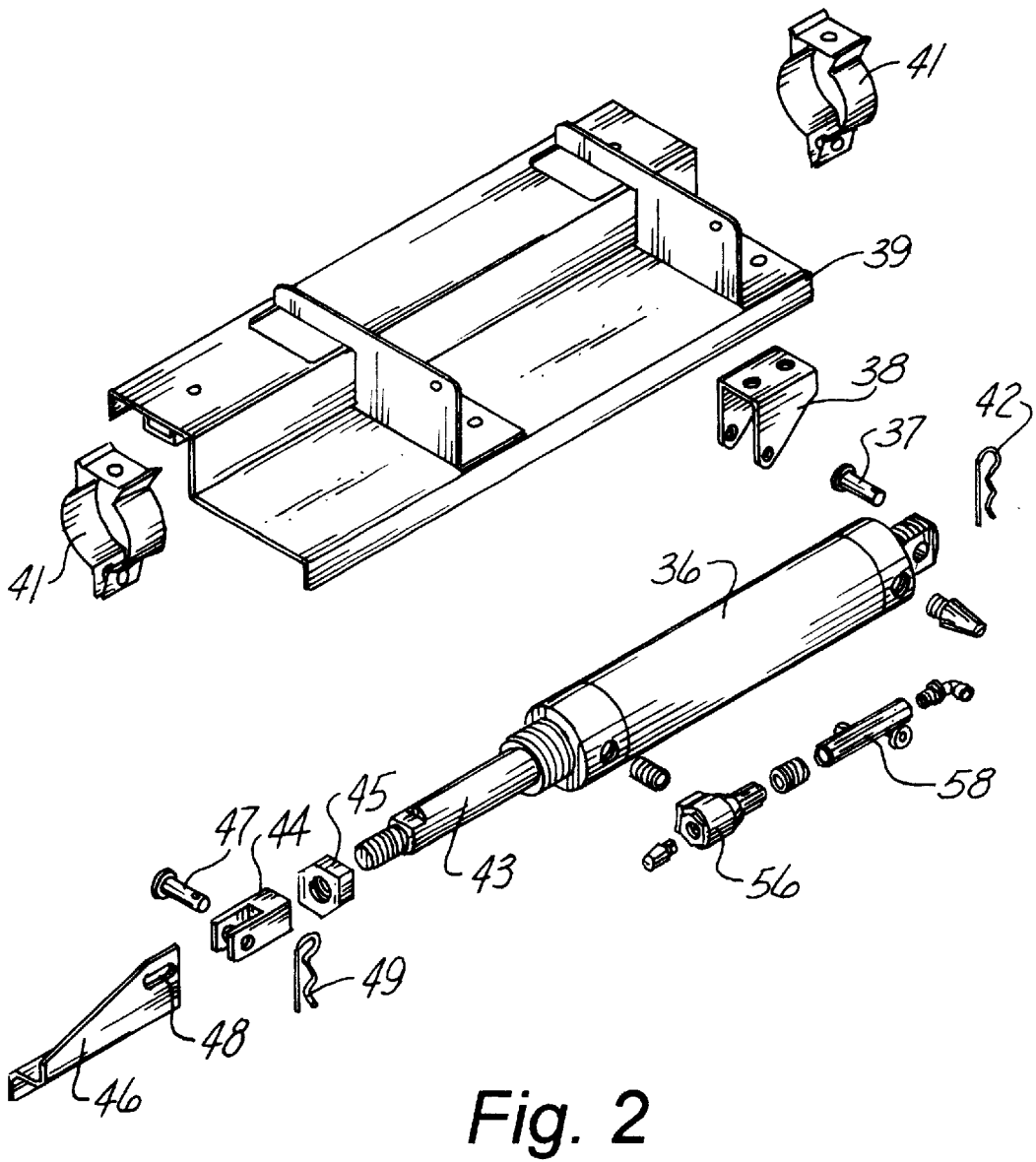
FIG. 2 is an exploded perspective view of the pneumatic cylinder and the structure for connecting it to the apparatus of the present invention.

Referring to FIGS. 1 and 2, the air cylinder (36) is pivotally attached by pin (37) in bracket (38) to a bracket (39) which is clamped onto the tube (11) by clamps (41). Pin (42) goes through an opening in pin (37) to hold it in place. The cylinder (36) has a piston therein (not shown) and connected to rod (43) which connects to clevis (44) by threaded fastener (45). The clevis (44) is connected to bracket (46) by a pin (47) which extends through openings in the clevis (44) and through the opening (48), and the pin (47) has an opening therein for receiving the pin (49) to hold it in place.

Fasteners (51) hold the bracket (46) to transverse member (22). Fasteners (52) hold the top end of the spring steel wire (19) to the transverse member (22). The air cylinder (36) is of a type referred to as a Humphrey 4-DP-6, and it has a flow regulator (58) operably attached thereto for causing the air cylinder to move more slowly than it otherwise would when it is opening the valve members (17). A quick exhaust valve (56) is a Humphrey SQE2 and the flow regulator (58) is a Deltrol F20BK.

The quick exhaust valve (56) causes the cylinder to move the doors or valve members (17) quickly for closing the reason for which will be explained below. The channel or transverse member (22) has a series of small holes therein for attaching the spring wires (19), which are cantilevered from each feed drop door (17). The cantilevered wire (19) exerts a load to positively close the door (17) and to keep feed from leaking past door (17) when the feed is in the drop (15). At feeding time, a pulling force on the master tripping transverse channel (22) is transferred through the cantilevered spring wire (19) which pulls open the door (17), by overcoming the door weight and the feed friction on the door (17), thereby letting feed (20) flow through the feed drop opening (16) and ultimately through feed drop opening (25). All successive feed drops react simultaneously with the pull on the master tripping transverse channel member (22).

Figure 4:
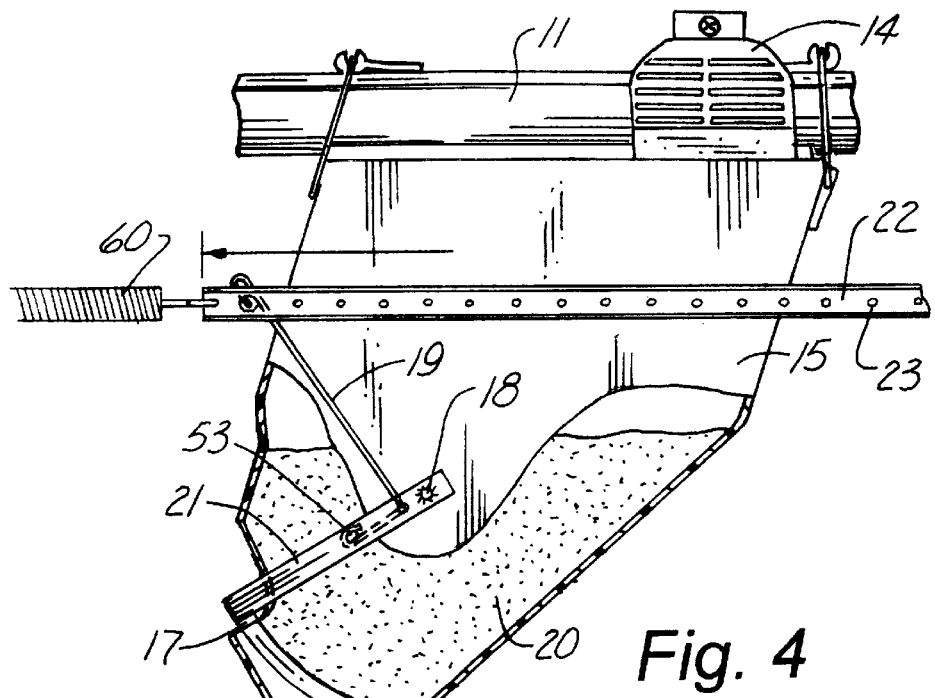
FIG. 4 is a side elevational view like FIG. 3 but showing the feed drop door biased to a closed position thereof.

Referring to FIGS. 1 and 4, it is noted that a tension spring (60) is attached at one end thereof to transverse member (22) and at the other end thereof to something fixed with respect to the building that the system (10) is installed in. Therefore, this spring (60) will bias the transverse member (22) to the position shown in FIG. 4 wherein the door (17) or valve member (17) is closed. When the push button in cabinet (34) is activated or the timer therein actuates the valve to pressurize the lines (27) and (35) the air cylinder (36) will shorten and pull the transverse member (22) from the position shown in FIG. 4 to the position shown in FIG. 5 by overcoming the tension on spring (60). This causes the door or valve member (17) to open to the position shown in FIG. 5 and allow the feed (20) to exit through openings (16) and (25). After that has occurred, the doors close quickly because of the quick exhaust valve (56). A fast closing minimizes that the doors will stick because quick closing causes more force on the door (17) as it closes. Fast closing also shocks and vibrates the containers (15). The rapid closing breaks loose any feed or feed residue which builds up. The door (17) is often opened a second time just after it is first opened to dispense the feed residue. Furthermore, as the doors (17) are closing, each door (17) exerts a force on the master tripping transverse channel (22), which multiples the closing force, enabling each door (17) to help the other doors (17) close thereby overcoming any obstacle which would keep them from closing.

Figure 3:
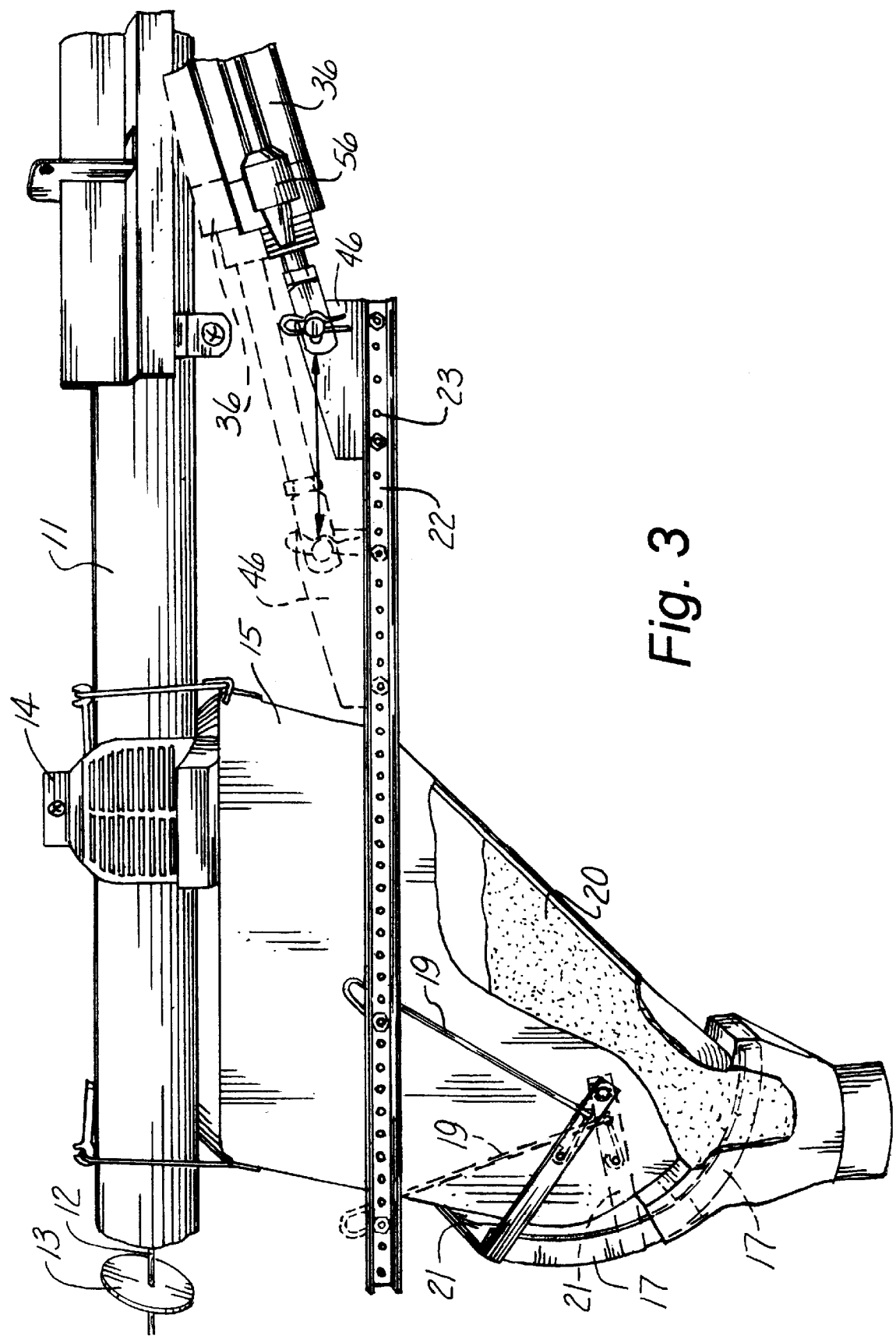
FIG. 3 is an enlarged side elevational view showing the cable conveying system with a feed drop and an actuator showing just the one end with an air cylinder thereon and showing movement from between the two positions thereof in solid and dashed lines.

FIG. 3 shows the pneumatic cylinder (36) in an extended position in dashed lines and the doors closed in dashed lines and when the air is communicated to the cylinder (36) the cylinder moves to the position shown in solid lines in FIG. 3 and the door is moved open as shown in solid lines in FIG. 3.

Figure 6:
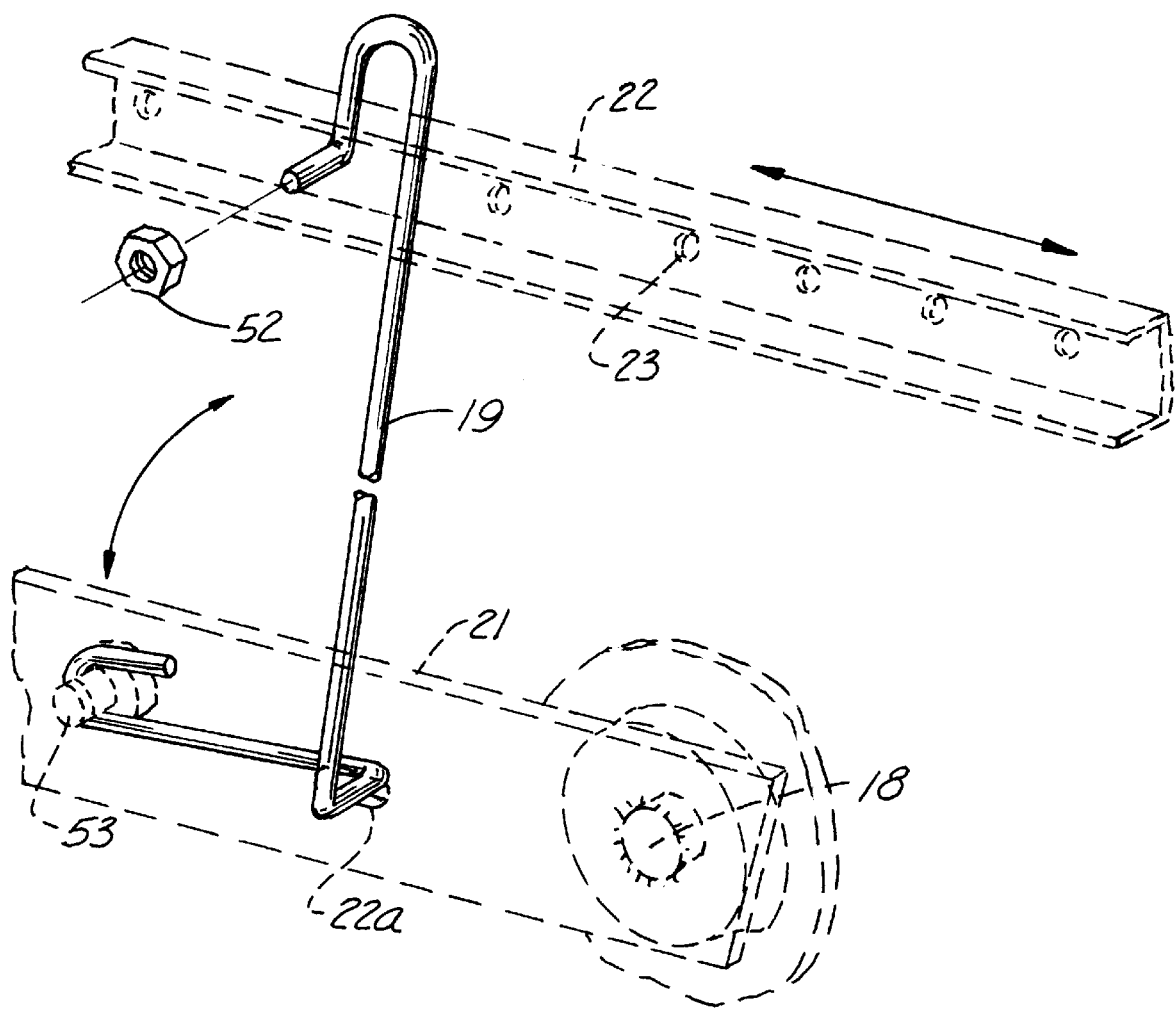
FIG. 6 is a perspective view of spring steel wires which are cantilevered from each feed drop door to help positively close the door and keep feed from leaking.

FIG. 6 shows the shape of the spring steel wire (19) and how it attaches to transverse channel member (22) by passing through an opening (23) and having a fastener (52) disposed on the top free end thereof. The wire (19) also passes through a slot (22a) in member (21) and is looped over a pin (53) which is rigidly attached to member (21). Member (21) pivots about a pin (18) attached to container (15).

Accordingly, it will be appreciated that the preferred embodiment disclosed herein does indeed accomplish the aforementioned objects. Obviously, many modifications and variations of the present invention are possible in light of the above teachings. It is therefore to be understood that, within the scope of the appended claims, the invention may be practiced otherwise than as specifically described.

We claim:

1. An opening and closing apparatus for a feed conveying system adapted for use in buildings having a plurality of feeding stations, said apparatus comprising:

a plurality of containers for receiving feed from a conveyor system, each of said containers having an opening in the bottom thereof;

a respective valve member disposed adjacent each respective one of said openings and each respective member having a closed position for preventing feed from falling out of each respective opening and an open position permitting the feed to fall out of each respective container through each respective opening therein;

a somewhat rigid transverse member adjacent to each one of said containers, said transverse member being biased to a first position and moveable to a second position; and a respective elongated member operatively attached at one end to said transverse member and operatively attached to a respective valve member at the other end thereof, each said elongated member being bendable to allow some differences in the relative positions between the orientation of each respective one of said valve members to a substantially identical orientation at any one time with respect to the transverse member, whereby the closing of some of the valve members will tend to force other valve members to the closed position as well, even if such other valve members are in the process of sticking open due to a malfunctioning thereof.

2. The apparatus of claim 1 including an air cylinder for pulling the transverse member to said second position thereof whereby the valve members will be moved to the open position.

3. The apparatus of claim 2 including a flow regulator operatively attached to said air cylinder for causing the air cylinder to decrease the speed of movement of the transverse member as it is moved from the first position to said second position whereby the valve members are opened more slowly than they otherwise would move.

4. The apparatus of claims 2 or 3 including an in-line bleeder valve operatively attached to said air cylinder for causing the air cylinder to increase the speed of movement of the transverse member as it is moved from said second position to the first position thereof whereby the valve members are closed more quickly than they would otherwise move.

* * * * *